J. PEARD.
SCHOOL DESK.
No. 10,825. Reissued Apr. 12, 1887.
Fig. 2.
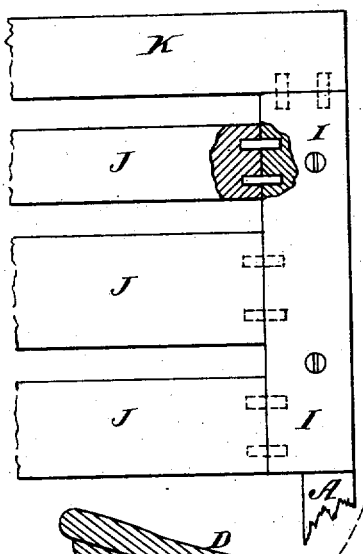
Fig. 1.
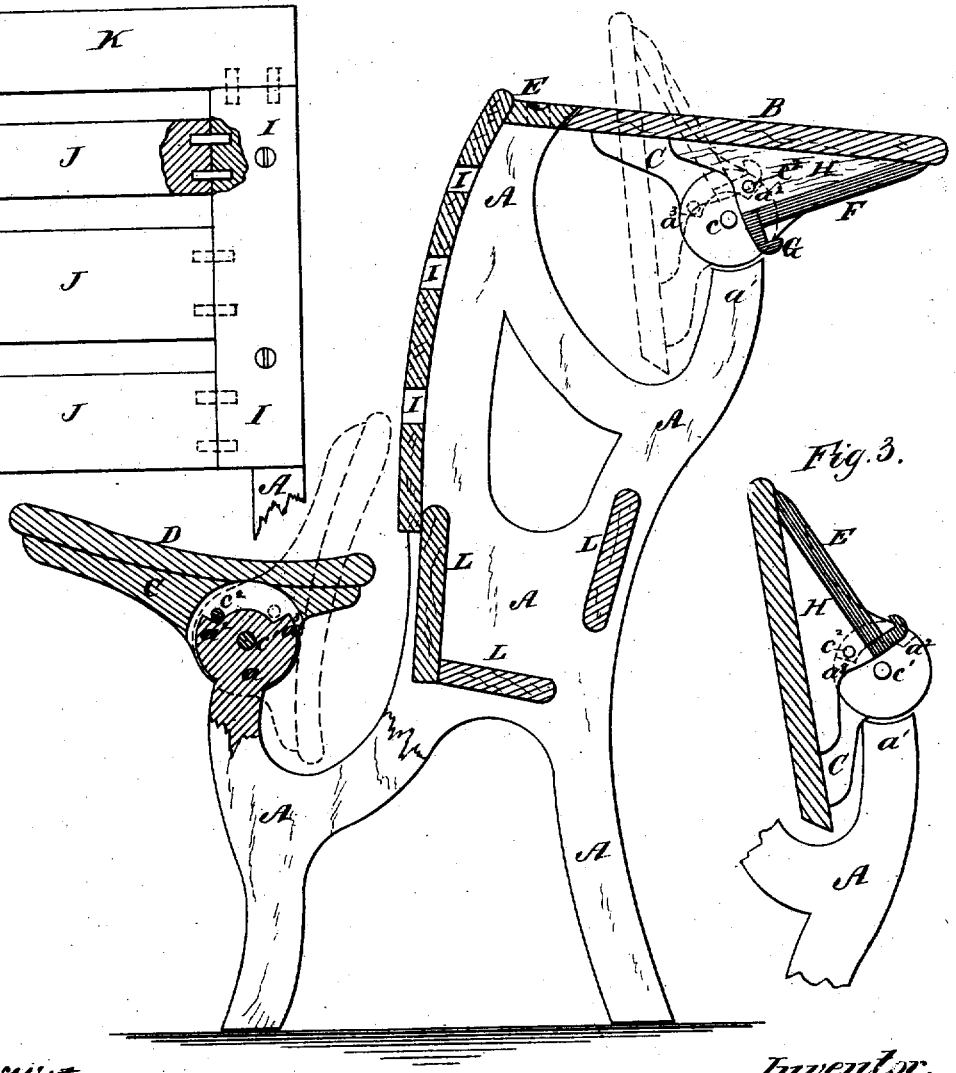
Fig. 3.
Witnesses.
H. F. Parker.
Thomas Hunt
Inventor.
John Peard,
by
J. Hindmarsh Hyde
Atty.
N. PETERS, Photo-Lithographer, Washington, D. C.

UNITED STATES PATENT OFFICE.

JOHN PEARD, OF NEW YORK, N. Y.

SCHOOL-DESK.

SPECIFICATION forming part of Reissued Letters Patent No. 10,825, dated April 12, 1887.

Original No. 115,232, dated May 23, 1871. Application for reissue filed June 15, 1885. Serial No. 168,827.

*To all whom it may concern:*

Be it known that I, JOHN PEARD, of the city, county, and State of New York, have invented a new and useful Improvement in School Desks and Seats; and I do hereby declare that the following is a full, clear, and exact description thereof, which will enable others skilled in the art to make and use the same, reference being had to the accompanying drawings, forming part of this specification, in which—

Figure 1 is a detail sectional view of my improved desk and seat. Fig. 2 is a front view of a portion of the seat-back, part being broken away to show the construction. Fig. 3 is a detail sectional view of a portion of the same.

Similar letters of reference indicate corresponding parts.

My invention has for its object to improve the construction of school desks and seats so as to make them simple in construction, convenient, and comfortable in use; and it consists in the construction and arrangement of the book-board, as hereinafter more fully described.

A are the end frames or side supports of the desk and seat, which are cast in the required shape. The middle parts of the upper ends of the cast frames A project in the rear of the seat-back, and are recessed, as shown in Fig. 1, to allow space for the movement of the edge of the desk B when turned up in the position shown in dotted lines in Fig. 1 and in full lines in Fig. 3.

C are brackets, to which the ends of the desk-board B and seat D are attached, and upon the lower edge of the said brackets, between their centers and rear ends, are formed the recesses to receive the circular upper end, $a'$, of the rear part or arm of the top of the end frame, A.

The circular end $a'$ is recessed upon its upper side, as shown in Fig. 1, thus forming two shoulders or stops, $a^2$ $a^3$, to receive the check or stop pin $c^2$, to stop and hold the desk and seat into position both when turned down and up, the shoulders $a^2$ $a^3$ and pin $c^2$ being so arranged as to stop the desk-board B before it comes in contact with the frames A.

The check-pin $c^2$ passes through the brackets C, so as to cross the recess in said bracket in proper position to enter the recess in the end of the arm $a'$ and strike against the shoulders $a^2$ $a^3$ of said arm.

The pin $c$ should have a piece of rubber tubing placed upon it, to prevent noise when the desk-board B is turned and to prevent the said pin from striking against the said shoulders.

C′ is the pivoting-pin, which passes through the recess part of the bracket C and through the circular ends of the arm $a'$.

The desk B and seat D may both be connected to the end frames by joints exactly alike in construction.

E is the stationary part of the desk-board, which consists of a narrow board attached to the upper end of the forward part of the frame A. The lower corner of the rear edge of the board E and the upper corner of the forward edge of the desk-board B are beveled off, as shown in Fig. 1, to relieve the check-pin $c^2$ from having to sustain the whole weight of the desk-board when turned down.

F is a board, the outer edge of which fits against outer edge of the under side of the desk-board B, and to its inner edge is attached a shoulder-flange or edge-board, G.

The flanged board F G is secured in proper position by being attached to wedge-shaped blocks H, interposed between the desk-board B and a book or reading board, F.

The board F is designed to receive books for reading or studying, and holds them in proper position for the scholar to read them when sitting erect in his seat. The shoulder-flange G receives and holds the lower ends of the leaves. The flanged board F G may also be used for holding drawing-paper, &c.

The reading-board F G is so arranged that the outer edge of the edged board G, when the desk is turned up, may be about upon a line with the rear edge of the joints, so that the scholars, when passing in and out, will not hit against said joint.

I are the end pieces of the seat-back, which are got out upon a curve corresponding with the curve of the upper part of the forward edge of the end frames, A.

J are the lower horizontal bars of the back, the ends of which are doweled to the inner edges of the pieces I.

K is the upper horizontal bar of the seat-back, which extends across the upper ends of the pieces I, and its lower edge is doweled to the upper ends of said end pieces, I.

By this construction a seat-back is produced curved to the proper form and ready to be applied to the end frames, A. This construction also saves timber and labor in getting out the backs, and at the same time makes them strong, comfortable in use, and neat and finished in appearance.

L is the book-box, which is attached to the frames A in the ordinary manner, except that it is extended downward, so as to give more space for the books, and at the same time leave more space between it and the desk-board B.

In case the desk is made without the seat, the forward legs of the frames A are extended down in the same manner as the rear legs, the forward projection to support the seat being omitted.

Having thus described my invention, I claim as new and desire to secure by Letters Patent—

1. The flanged reading or book board F G, arranged on and under the desk B, combined with end frames or side supports for the seat-back, projecting in rear of the seat-back, the said board being pivoted between such supports on pivots intermediate the back and front edges, so as to fold by swinging its back edge upward and forward and its front edge downward and backward into such position that the reading-board will fill the space between the said projecting side supports, and thereby be brought in proper position for a scholar to read therefrom when sitting erect in the rear thereof.

2. The combination, with end frames of a school-seat projecting in rear of such seat, of a desk, B, having a flanged reading-board, F G, on the under side thereof, such desk being pivoted by brackets between such rear projecting end frames on hinges provided with shoulder-stops $a^2$ $a^3$, concealed between check $c'$ and end $a'$, and arranged so as to fold by swinging the back edge upward and forward and the front edge downward and backward until stopped by shoulder $a^3$ in such position as to enable a scholar to read therefrom when sitting erect in the rear thereof.

JOHN PEARD.

Witnesses:
THOMAS HUNT,
J. E. HINDON HYDE.